3,270,061
OXYGEN-CONTAINING DICYCLODIENE
DERIVATIVES
Saul Chodroff and Joseph Linsk, Brooklyn, N.Y., and Aaron Zale, Colonia, N.J., assignors to Norda Essential Oil & Chemical Co., Inc., New York, N.Y., a corporation of New York
No Drawing. Filed Apr. 16, 1964, Ser. No. 360,412
3 Claims. (Cl. 260—586)

This invention relates to certain novel oxygen-containing cyclodiene derivatives, their preparation and use. More particularly this invention relates to novel fragrant compounds which contain an octahydro-4,7-methanoindene structure to which is attached a glycidate group or an aldehyde or a ketone group.

Various reactions have been heretofore described in the chemical literature for converting cyclodiene hydrocarbons such as cyclopentadiene or dicyclopentadiene into polycyclic alcohols such as hexahydro-exo-4,7-methanoinden-exo-5-ol, which contains one double bond, or the corresponding fully saturated octahydro compound. The oxidation of such a saturated alcohol to the corresponding ketone is also known. However, while the supply of the required starting materials is ample and the aforementioned syntheses are relatively simple and economical, little practical utility has been found for the oxygenated products heretofore obtained therefrom.

It has now been discovered that these known cyclodiene derivatives, e.g., octahydro-exo-4,7-methanoinden-5-one can be conveniently converted into a variety of fragrant compounds which are valuable in the formulation of perfume oils, for example those used for floral perfumes, soaps, cosmetic creams, baby lotions, etc.

Accordingly, it is an object of the present invention to provide novel compounds useful in perfumery as well as in other arts. Another object is to provide convenient, effective and economical processes for obtaining valuable fragrant compounds from cyclodiene dimers such as dicyclopentadiene, methylcyclopentadiene dimer, and the codimer of cyclopentadiene and methylcyclopentadiene, and particularly from the known oxygen-containing derivatives thereof, notably from the ketone derivatives such as the aforementioned octahydro-4,7-methanoinden-one.

These and other objects, as well as the nature, scope, operation and utility of this invention will become more fully apparent from the subsequent description. In reading this description it will be understood that in the absence of a contrary indication all amounts and proportions of materials are expressed herein on a weight basis, all temperatures are expressed herein in degrees centigrade, and all pressures are expressed herein in terms of the equivalent height of a column of mercury.

The principal reactant used herein is a keto derivative of dicyclopentadiene corresponding to the formula (I)

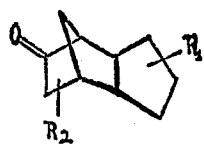

wherein $R_1$ and $R_2$ are identical or different members selected from the group consisting of hydrogen and methyl radicals. While these compounds usually and predominantly consist of the pertinent exo-isomers their corresponding endo-isomers can be used likewise in the practice of the present invention.

One such particularly suitable and convenient reactant is octahydro-exo-4,7-methanoinden-5-one, i.e., the compound corresponding to the above Formula I wherein both $R_1$ and $R_2$ represent hydrogen atoms. As is well known in the art, this compound is a liquid which has a molecular weight of 150, a boiling point of 129–132°/29 mm. and a refractive index $n_D^{25}=1.4995$. As described in the prior art, it is readily obtained from dicyclopentadiene via the corresponding monoolefinic alcohol, hexahydro-exo-4,7-methanoinden-exo-5-ol, which is then hydrogenated to give the corresponding saturated alcohol and the latter is finally oxidized to give the desired ketone. See, for instance, the description of such a preparation by Bruson et al., J.A.C.S., 67, 726 (1945).

Thus, for instance, the monoolefinic alcohol can be prepared by hydrating dicyclopentadiene in the presence of aqueous sulfuric acid under reflux, separating the resulting mixture into an organic and an aqueous phase, extracting the separated aqueous phase with a solvent such as benzene, toluene, ethyl acetate, chloroform or the like so as to recover additional organic material therefrom, combining the organic layers, washing them with dilute aqueous sodium hydroxide and with water until neutral, stripping the solvent from the washed organic phase at reduced pressure (e.g., 5"), and recovering the monoolefinic alcohol from the stripped residue by distilling the latter at about 97°/5 mm. to 95°/2.7 mm. The monoolefinic alcohol (M.W. 150) is a liquid which boils at 239–240° at atmospheric pressure and at 102–104° at 7 mm. The average refractive index of this material, $n_D^{25}$, is 1.5246.

The monoolefinic alcohol is next converted to the saturated alcohol by hydrogenation, e.g., by diluting 100 parts of the former with about 50 to 60 parts of a $C_1$ to $C_3$ alkanol such as methyl or isopropyl alcohol, adding activated Raney nickel catalyst thereto, and shaking the mixture for a few hours in a Paar hydrogenator in the presence of hydrogen at a pressure of about 40 to 60 p.s.i. (gauge) and at ambient temperature, e.g., 0° to 50°, until the theoretical amount of hydrogen is reacted. The mixture is then filtered, the filtrate stripped of solvent on a steam bath at reduced pressure, e.g., 5", and the product finally distilled at 70°/0.1 mm. to 75°/0.3 mm. The distilled product alcohol (M.W. 152) is a solid which melts at 53–54°.

Finally the required keto intermediate is obtained by oxidizing the saturated alcohol. This can be accomplished by dissolving 100 parts of the alcohol in an oxidation resistant solvent, e.g., in 150 to 300 parts of isopropyl ether, ethyl ether, hexane or benzene and gradually adding thereto an oxidizing solution of sodium or potassium dichromate in aqueous sulfuric acid. The oxidizing solution, which normally should contain about 4 moles of $H_2SO_4$ per mole of dichromate, should desirably be added to the organic solution in an amount such as to provide about 0.35 to 0.5 mole of the dichromate per mole of the alcohol being oxidized. The oxidation is preferably carried out at ambient temperature, e.g., at 20 to 30°. After separating the organic from the aqueous layer, the latter is again extracted with a suitable solvent such as isopropyl ether and after combining the extract with the principal organic layer the mixture is washed with water, with saturated aqueous sodium bicarbonate solution and finally again with water until neutral. The solvent ether is next stripped on a steam bath at 5" Hg reduced pressure and the product distilled at 65°/1.0 mm. to 79°/2.1 mm. The resulting ketone product is thus readily obtained in a yield of 70 to 85% of theory and in a purity corresponding to an octahydro-exo-4,7-methanoinden-5-one content of at least 90 to 95%. Characteristically, for instance, the distilled product may have a refractive index ($n_D^{20}$) between about 1.4995 and 1.5050. The principal remaining impurity in such a product is unreacted feed alcohol, which is quite unobjectionable since it does not interfere with the intended use of the product in subsequent processing. The pure octahydro-exo-4,7-methano-inden-5-one (M.W. 150) has a boiling point of 129–132°/ 29 mm. and a refractive index $n_D^{25}=1.4995$.

In accordance with the present invention the above described ketone compound corresponding to Formula I is used to make fragrant dicyclodiene derivatives corresponding to one of the following formulas:

(II)

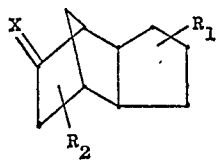

or

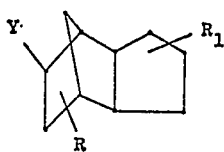

wherein $R_1$ and $R_2$ are as described above with reference to Formula I. In Formula II, X is a radical

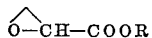

which forms a glycidate structure with the carbon atom of the cyclodiene ring to which it is attached, the R in this radical being selected from the class consisting of hydrogen and alkyl groups of 1 to 4 carbon atoms such as methyl, ethyl or isobutyl. In Formula III, Y is a radical selected from the group consisting of (1) an aldehyde radical —CHO; and (2) an unsaturated ketone radical —CH:CH.CO.R' wherein R' in turn is an alkyl radical of 1 to 5 carbon atoms such as methyl, isopropyl, isobutyl or n-amyl. The corresponding saturated ketone radicals $CH_2$—$CH_2$—COR' may be employed likewise. It will be understood, of course, that in a compound corresponding to Formula III the carbon atom of the dicyclopentadiene structure to which the monovalent Y radical is attached also has one hydrogen atom attached to it. On the other hand, in a compound corresponding to Formula II the carbon atom of the dicyclopentadiene structure to which the divalent X radical is attached and with which it forms a glycidate structure has no hydrogen atoms attached to it. Techniques of synthesis adaptable to this type of preparation have been described by Newman et al. in connection with other materials in Organic Reactions, vol. 5, ch. 10 (Darzens reactions), pages 413–440, John Wiley & Sons (1949).

The keto compound, e.g., octahydro-exo-4,7-methano-inden-5-one, can be converted to a glycidate, e.g., octahydro-exo-4,7-methanoinden-5-ethyl glycidate. This can be done by reacting it in the presence of an alkali metal hydride such as sodium or lithium hydride or a corresponding alkoxide such as sodium ethoxide with a $C_1$–$C_4$ alkyl alpha-chloroacetate ester such as $ClCH_2COOC_2H_5$. The corresponding alpha-chloropropionate and alpha-chlorobutyrate esters may be used similarly but these will eventually yield a ketone product where the use of the chloroacetate leads to an aldehyde product. The resulting glycidate ester then can be converted to the corresponding glycidic acid, e.g., by saponification of the ester followed by acidulation of the resulting salt. The glycidic acid can be readily decarboxylated to give the corresponding aldehyde, e.g., octahydro-exo-4,7-methano-inden-5-al. Finally, the aldehyde can be converted into various unsaturated or saturated ketones, e.g., into (octahydro-exo-4',7'-methanoinden-5')-buten-1-one-3 by reaction with acetone or into the corresponding penten-1-one-3 derivative by reaction with methyl ethyl ketone. Saturated ketones can be obtained by suitable selective hydrogenation of such unsaturated ketones, e.g., in the presence of a palladium catalyst.

In order to facilitate the making of the novel compounds and their use by others an illustrative embodiment thereof will now be described in detail.

EXAMPLE 1.—OCTAHYDRO-EXO-4,7-METHANO-INDEN-5-ETHYL GLYCIDATE

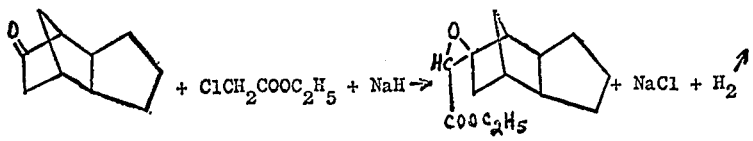

To a solution of 270 g. (1.8 M) octahydro-exo-4,7-methanoinden-5-one and 245.2 g. (2 M) ethyl chloroacetate in 900 ml. anhydrous toluene, was added 96 g. (2 M) of 50% sodium hydride dispersion in mineral oil at 30–35° over a three hour period. The reaction was exothermic and was controlled with an ice-alcohol bath. The mixture was stirred with cooling at 30–35° for an additional hour. After this time the internal temperature dropped and no hydrogen gas evolved. The mixture was stirred overnight without further cooling. Then 50 ml. methanol was added to react with excess sodium hydride. The mixture was diluted with 500 ml. water and made acid to litmus with 15 ml. acetic acid. The aqueous layer was extracted with 150 ml. toluene. The organic layers were combined and washed with water, then bicarbonate solution, and finally with water to neutral. The solvent was stripped on the steam bath at approximately 27" of Hg and the residue distilled through a 7" Vigreux column to yield 308.5 g. of product with a boiling point of 123°/0.4 mm. to 137°/1.2 mm., and a refractive index of $n_D^{20}$ 1.4924–1.4934. This glycidate was 100% pure by saponification value and represented at 73% yield of theory. The novel glycidate derivative described in this example is an aromatic material possessing olfactory characteristics of the smooth floral type. It blends well in many floral perfume combinations and can be used to impart a floral-like quality to other perfumes, e.g., to woody ones. Its addition to such perfume oils, in concentrations from about 1 to about 20%, imparts warmth and persistence to basic perfume oil formulations that otherwise lack these characteristics. A perfume oil which pleasingly simulates the fragrance of acacia can be formulated as follows:

Acacia (I)

| | |
|---|---:|
| Novel glycidate derivative | 15.0 |
| Yara-yara (methyl naphthyl ether) | 12.5 |
| Aldehyde C–12, 10% | 10.0 |
| Fleur d'Oranger | 1.5 |
| Methyl anthranylate | 2.5 |
| Geraniol Extra | 10.0 |
| Hydroxy citronellal | 17.5 |
| Phenyl ethyl alcohol | 20.0 |
| Benzyl benzoate | 10.0 |
| Linalool Ex Bois de Rose | 15.0 |
| Hydroxy citronellal methyl anthranylate condensation product | 1.0 |
| Oil Orange Florida | .2 |
| | 115.2 |

Violet (II)

| | |
|---|---:|
| Novel aldehyde derivative | 1.0 |
| Ionone alpha | 50.0 |
| Ionone beta | 5.0 |
| Methyl ionone gamma | 9.0 |
| Heliotropine | 3.0 |
| Methyl heptin carbonate, 10% sol. | 10.0 |
| Anisic aldehyde | 1.0 |
| Verveine de Grasse | 0.5 |
| Musc ketone | 4.0 |
| Oil Ylang Extra | 5.0 |
| Benzyl acetate | 5.0 |
| Diethyl phthalate | 7.5 |
| | 101.0 |

EXAMPLE 2.—OCTAHYDRO-EXO-4,7-METHANOINDEN-5-AL

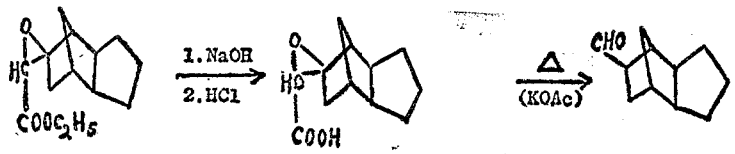

236 g. (1 mole) of the ethyl glycidate derivative described above was dissolved in 550 ml. methanol. 80 g. (2 moles) of NaOH in 700 ml. H₂O was added to the organic solution at 30–35° over a 30-minute period. A cold water bath was used to cool the mixture since the reaction was slightly exothermic. Thereafter the mixture was stirred, without cooling, overnight for 17 hours. The resulting sodium salt of the glycidate was next acidified to congo red with 180 ml. conc. HCl in 540 ml. H₂O. The glycidic acid thus obtained was extracted with 250 ml. toluene and then washed with 2 x 250 ml. water to render the mixture neutral to congo red paper. The solvent was stripped on a steam bath at 27″ Hg pressure to yield 184 g. of residue. Some decarboxylation was noted during the stripping. The residue gave a positive aldehyde test with 2,4-dinitrophenyl hydrazine reagent (DNPH).

To the residue was added 6 g. potassium acetate and the mixture was heated under vacuum while 128 g. of product distilled over at 99°/4.5 mm. to 85°/1.5 mm., representing 78.5% yield of theory. The product (M.W. 164) had a refractive index $n_D^{20}$ 1.4999. Other convenient decarboxylation methods such as heating with sodium hydroxide or sodium bicarbonate may be employed with similar results.

The novel aldehyde derivative described in this example is an aromatic material possessing an intense green fragrance with earthy overtones. Its addition, in concentrations of between about 0.2 and 2% based on the total perfume oil, is particularly valuable in the formulation of the heavier florals such as violet. One such very effective formulation is illustrated below.

EXAMPLE 3.—1-(OCTAHYDRO-EXO-4',7'-METHANOINDEN-5')-BUTENE-1-ONE-3

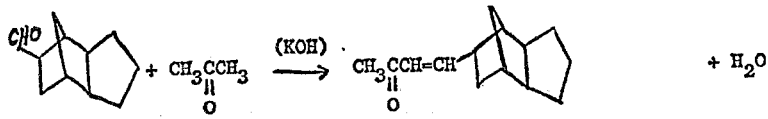

To a solution of 49.2 g. (0.3 M) octahydro-exo-4,7-methanoinden-5-al in 23.5 g. water and 249 g. (4.3 M) acetone, was added 4 g. KOH in 38 ml. water at 35–40° internal temperature over a 5-minute period. The use of more than the stoichiometric amount of acetone is helpful in increasing the yield of desired product. Preferably about 8 to 15 moles of acetone are used per mole of the polycyclic aldehyde. After the addition of the potassium hydroxide, the reaction mixture was heated at 35–40° for 2½ hours. Then the mixture was cooled to 25–30° and acidified with 4 ml. glacial acetic acid to a pH of 6. The acetone and water were stripped on a steam bath at 27″ Hg, and to the cooled mixture was added 100 ml. hexane. The organic solution was washed with saturated sodium bicarbonate solution and finally with saturated salt water solution to neutral. After stripping the solvent, the residue was distilled through a 10″ Vigreux column to yield 52.0 g. of product, representing 84% yield of theory. The product (M.W. 204) distilled at 133–147°/0.7 mm. and had a refractive index $n_D^{20}$ 1.5158–1.5173.

The novel ketone derivative described in this example is an aromatic material possessing a dry woody flowery character with a wine-like top note. In concentrations from about 1 to about 20% it is particularly useful in the formulation of novel floral combinations, e.g., oriental, jasmin or violet fragrances. Its use in an acacia-type formulation is illustrated below.

Acacia (III)

| | |
|---|---|
| Yara-yara | 12.5 |
| Aldehyde C-12, 10% | 10.0 |
| Fleur d'Oranger | 1.5 |
| Methyl anthranylate | 2.5 |
| Geraniol Extra | 10.0 |
| Hydroxy citronellal | 17.5 |
| Phenyl ethyl alcohol | 20.0 |
| Benzyl benzoate | 10.0 |
| Linalool Ex Bois de Rose | 15.0 |
| Hydroxy citronellal methyl anthranylate condensation product | 1.0 |
| Oil Orange Florida | .2 |
| Novel ketone derivative | 15.0 |
| | 115.2 |

EXAMPLE 4.—1-(OCTAHYDRO-EXO-4',7'-METHANOINDEN-5')-PENTEN-1-ONE-3

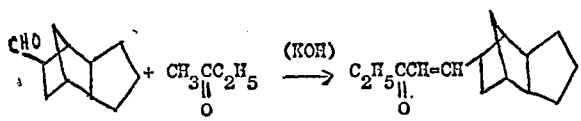

To a solution of 32.8 g. (0.2 M) octahydro-exo-4,7-methanoinden-5-al in 43.2 g. (0.6 M) methyl ethyl ketone, was added 1.3 g. KOH in 60 ml. methanol at reflux over a 20-minute period. The reaction mixture was refluxed for 4 hours (internal temp. was 69°), cooled to 25-30°, acidified with 1.3 ml. glacial acetic acid, and 150 ml. water and 250 ml. hexane was added. The organic layer was separated from the mixture and washed with saturated salt water solution, saturated sodium bicarbonate solution, and finally again with saturated salt water solution to neutrality. After stripping the hexane, the residue was distilled through a Claissen head to yield 22.5 g. of product, representing 52% of theory. The product (M.W. 218) distilled at 100-106°/0.3 mm. and had a refractive index $n_D^{20}$ 1.5127-1.5180. Instead of acetone or methyl ketone higher ketones such as methyl isobutyl ketone can be used similarly to produce the corresponding higher ketone derivatives of the dicyclopentadiene.

The methyl ethyl ketone derivative described in this example has a fragrance similar to but somewhat brighter than that of the acetone derivative described in the previous example. It has a dry woody character suggestive of Orris. Its use in an acacia type formulation is illustrated below.

Acacia (Fougere) (IV)

| | |
|---|---|
| Oakmoss Super | 1.5 |
| Phenyl ethyl alcohol | 3.0 |
| Amyl salicilate | 6.0 |
| Coumarin | 15.0 |
| Oil lavender, 40/42 | 11.0 |
| Oil geranium Algerian | 9.0 |
| Anisic aldehyde | 1.0 |
| Oil bergamot | 9.0 |
| Linalyl acetate Ex Bois de Rose | 4.0 |
| Oil petitgrain | 6.0 |
| Musc xylene | 3.0 |
| Oil cloves | 1.5 |
| Methyl ionone gamma | 2.0 |
| Oil aspic | 3.0 |
| Resinoid Peru | 6.0 |
| Resinoid benzoin | 4.0 |
| Resinoid labdanum | 3.0 |
| Diethyl phthalate | 12.0 |
| Novel MEK derivative | 10.0 |
| | 110.0 |

Having described the general nature as well as representative embodiments of the invention, its scope is particularly pointed out in the appended claims.

What is claimed is:
1. A compound corresponding to the formula

wherein Y is a radical selected from the group consisting of —CH:CH.COR' and —CH$_2$.CH$_2$.COR', R' being an alkyl radical of 1 to 5 carbon atoms.

2. 1-(octahydro-exo-4',7'-methanoinden-5')-butene-1-one-3.

3. 1-(octahydro-exo-4',7'-methanoinden-5')-pentene-1-one-3.

References Cited by the Examiner

UNITED STATES PATENTS

| 1,899,340 | 2/1933 | Knorr | 260—348 |
|---|---|---|---|
| 2,879,299 | 3/1959 | Büchner | 260—598 |

FOREIGN PATENTS 953,076 11/1956 Germany.

OTHER REFERENCES

C & En., Feb. 24, 1958, p. 103.

Schulz, F.; Seifen-Öle-Fette-Wachse, vol. 10, 1960, pp. 303–304, 342, 380.

WALTER A. MODANCE, *Primary Examiner.*

NORMA S. MILESTONE, *Assistant Examiner.*